United States Patent [19]

Roggin

[11] 4,173,369
[45] Nov. 6, 1979

[54] PROTECTIVE VEHICLE PARTITION

[76] Inventor: Sam Roggin, 23091 Rosewood, Oak Park, Mich. 48237

[21] Appl. No.: 841,882

[22] Filed: Oct. 13, 1977

[51] Int. Cl.$^2$ .............................................. B60R 27/00
[52] U.S. Cl. .................................................. 296/24 R
[58] Field of Search ........... 296/24 R; 280/150, 150 B

[56] References Cited

U.S. PATENT DOCUMENTS

| | | | |
|---|---|---|---|
| 3,469,090 | 9/1969 | Redus | 296/24 |
| 3,547,217 | 12/1970 | Garza | 296/24 X |
| 3,632,155 | 1/1972 | Parker | 296/24 R |
| 3,667,801 | 6/1972 | Setina | 296/24 |
| 4,015,875 | 4/1977 | Setina | 296/24 |
| 4,035,014 | 7/1977 | Sellers | 296/24 R |

Primary Examiner—Joseph F. Peters, Jr.
Assistant Examiner—Gene A. Church
Attorney, Agent, or Firm—Whittemore, Hulbert & Belknap

[57] ABSTRACT

A protective vehicle partition including an opaque molded fiberglass lower transverse panel having lower side panels at both ends thereof positioned to extend toward the front of a vehicle with the partition installed in the vehicle, which side panels include openings therethrough at the top thereof for access to rear door locks of the vehicle from the front of the vehicle, a transparent, plexiglass upper transverse panel rigidly secured to the top of the lower transverse panel having a window therein for physical communication between the front and rear of the vehicle, upper side panels secured to each end of the upper transverse panel positioned to extend toward the front of the vehicle, and extensions on each end of the upper transverse panel extending from adjacent the top of the vehicle substantially below the rear door locks of the vehicle and engageable with the rear window operators of the vehicle to prevent 360° rotation thereof, said extensions having an outer edge contoured in accordance with the inner contour of the vehicle at the protective vehicle partition, and means for securing the protective vehicle partition to the center posts of the vehicle.

11 Claims, 7 Drawing Figures

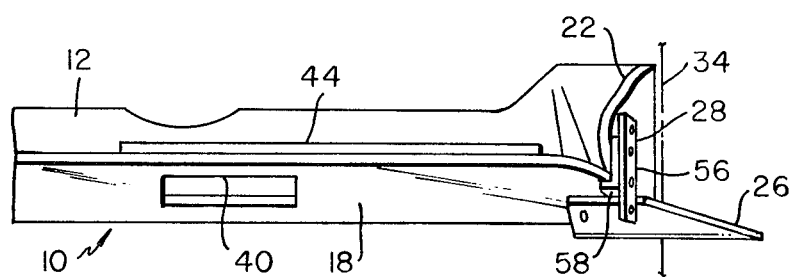
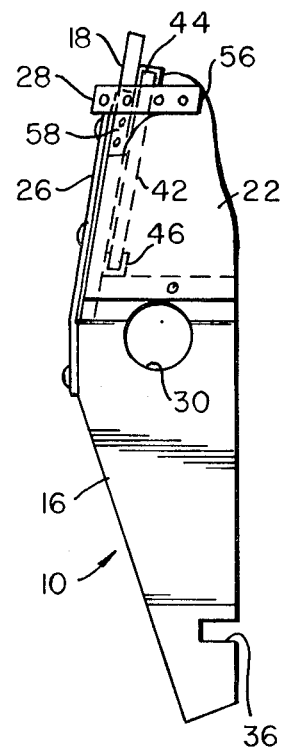
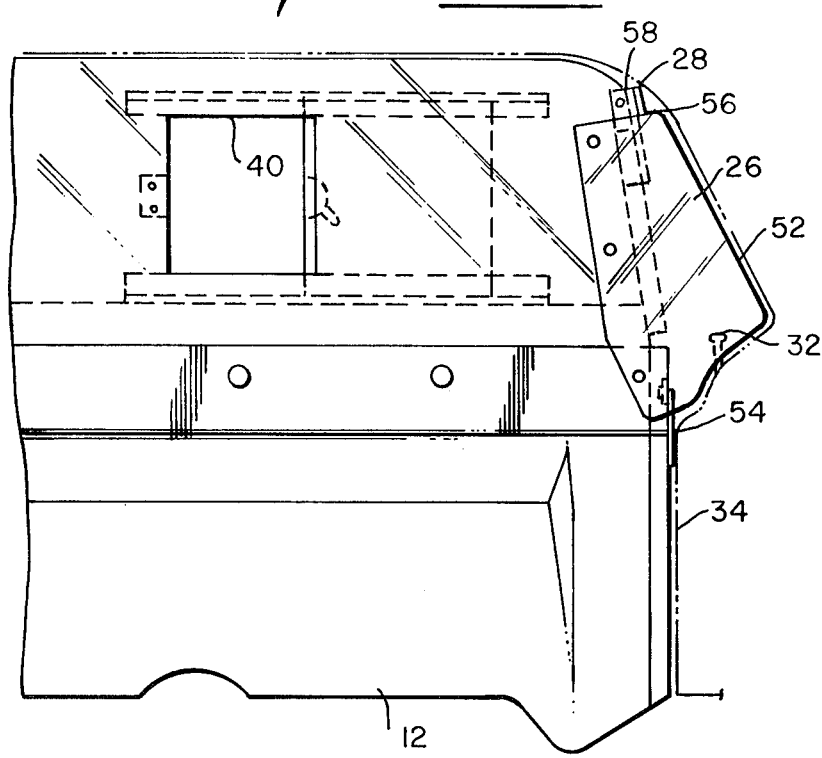
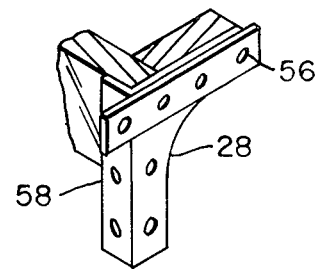
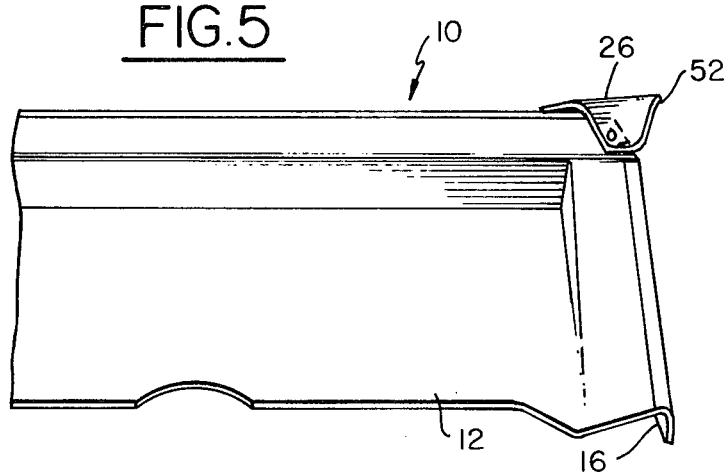

PROTECTIVE VEHICLE PARTITION

BACKGROUND OF THE INVENTION

1. Field of the Invention

The invention relates to protective vehicle partitions and refers more specifically to a bullet resistant protective vehicle partition including a molded fiberglass lower panel and a plexiglass upper panel having a window therein secured together and adapted to be connected to the center posts of a vehicle in which the protective vehicle partition is installed. The protective vehicle partition further includes lower and upper side panels and upper panel extensions constructed and arranged to prevent aiming a weapon around the ends of the partition and to permit operation of the rear door locks of a vehicle in which the protective vehicle partition is installed only from the front of the vehicle and to prevent operation of the rear window operators through a full 360° with the rear doors closed.

2. Description of the Prior Art

In the past, protective partitions for front seat occupants of vehicles such as police cars, taxicabs and the like have been known. Such known protective vehicle partitions have usually been a transparent panel connected between the top of the front seat and the roof of the vehicle, which panel has extended completely transversely of the vehicle. Such panels of the past have sometimes included openings therethrough for passing articles such as money and the like.

Such panels provided no protection between the top of the front seat and the floor of the vehicle and have allowed aiming of weapons around the ends of the panels as well as operation of both the rear door locks and window operators from the rear of the vehicle. Full protection of front seat occupants from ceiling to floor and around the ends of the partitions is desirable, and it is desirable to permit control of rear door locks and window operators only from the front of the vehicle in vehicles such as police cars.

SUMMARY OF THE INVENTION

The protective vehicle partition of the invention includes an opaque, lower, transversely extending molded fiberglass panel and a transparent, upper plexiglass panel secured to the top of the lower panel, both of which panels extend substantially the full width of a vehicle. A communication window which locking capability is provided in the upper transverse panel. The lower transversely extending panel, in accordance with the invention, includes lower molded fiberglass side panels positioned to extend toward the front of a vehicle in which the protective vehicle partition is installed, each of which includes a transverse opening therethrough at the top of the side panels to permit access to rear door locks from the front of the vehicle. Upper side panels of polycarbonate plastic are secured to the ends of the upper transversely extending panel which prevent aiming of weapons or passing of articles around the ends of the upper transverse panel into the front of the vehicle. Extensions are also provided on both ends of the upper transverse panel having a free side contoured to be complementary to the upper portion of the cross section of the vehicle at the protective vehicle partition, which extensions extend from adjacent the top of the vehicle a substantial distance below the rear door locks. The extensions engage the rear window operators of the vehicle to prevent rotation thereof through a full 360° with the rear doors of the vehicle closed. The entire protective vehicle partition is secured to the center posts of the vehicle to provide side impact and roll bar protection for vehicle occupants.

BRIEF DESCRIPTION OF THE DRAWINGS

FIG. 3 is a side view of the partition illustrated in FIG. 1, taken in the direction of arrow 3 in FIG. 2.

FIG. 4 is a top view of the partition illustrated in FIG. 1, taken in the direction of arrow 4 in FIG. 2.

FIG. 5 is a bottom view of the partition illustrated in FIG. 1, taken in the direction of arrow 5 in FIG. 2.

DESCRIPTION OF THE PREFERRED EMBODIMENT

Figure 1:
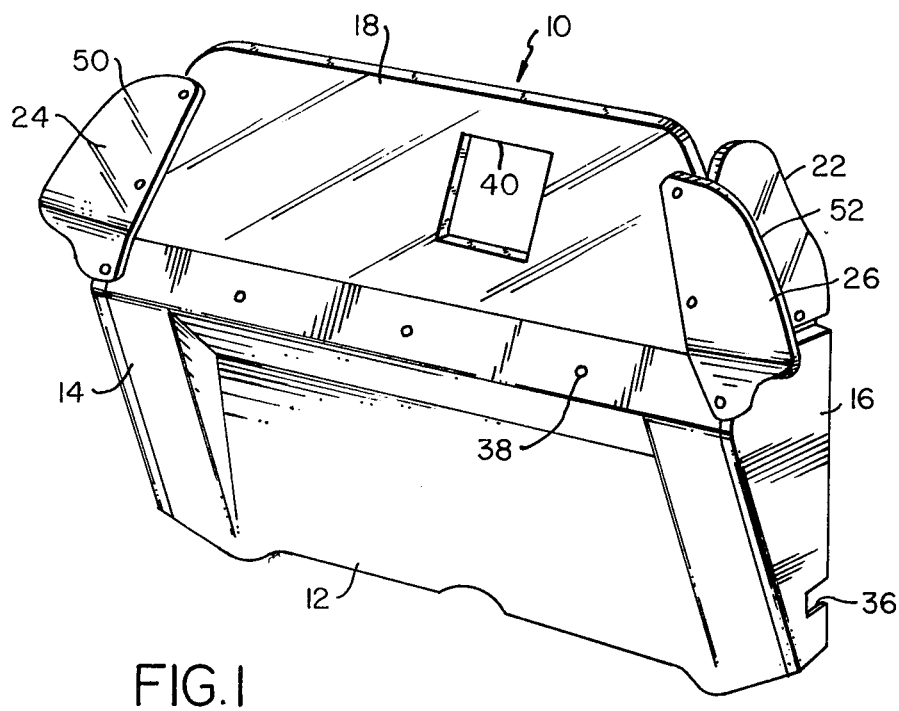
FIG. 1 is a perspective view of the protective vehicle partition of the invention.
Figure 2:
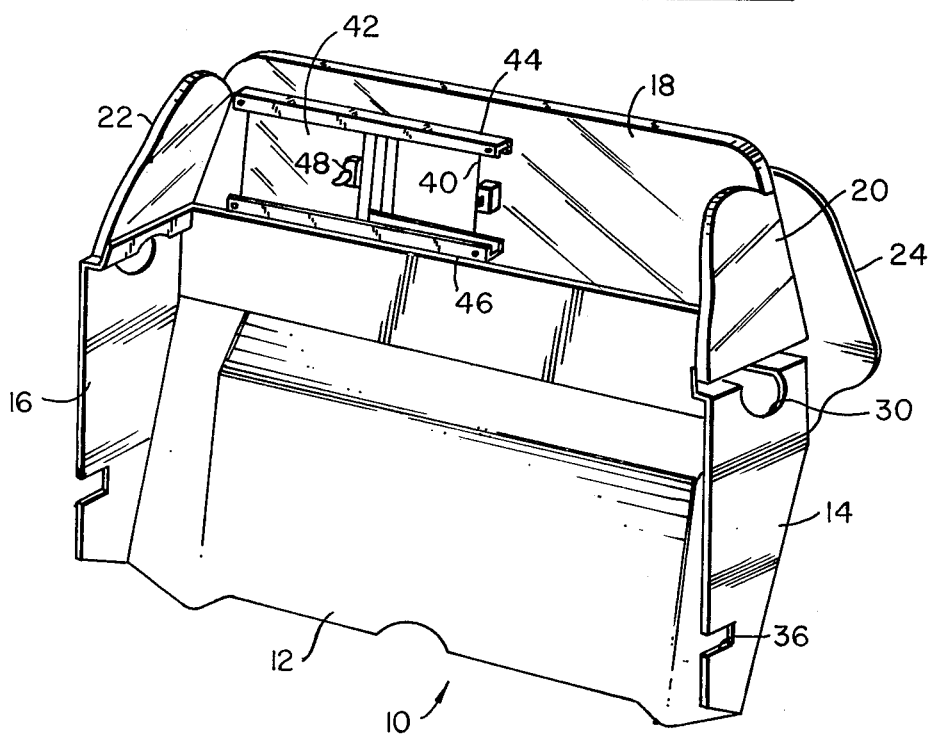
FIG. 2 is a front elevation view of the partition illustrated in FIG. 1.

As shown best in FIG. 1, the protective vehicle partition 10 includes the lower panel 12, lower side panels 14 and 16 and the upper panel 18. Upper side panels 20 and 22 and upper extensions 24 and 26 are also included in the partition 10. Means 28 are provided for securing the protective vehicle partition 10 to the center posts of a vehicle 34 in which the partition 10 is installed.

More specifically, the lower transverse panel 12 is constructed of molded fiberglass, is opaque, and is adapted to extend between the two sides of a vehicle in which the protective vehicle partition 10 is installed between the floor of the vehicle and the top of the front seat thereof.

The side panels 14 and 16, as shown, are integrally molded of the same bullet resistant molded fiberglass material as the transverse panel 12. The side panels 14 and 16 extend toward the front of the vehicle 34 in which the protective vehicle partition 10 is installed and each includes an opening 30 extending transversely therethrough adjacent the top thereof to permit access to the rear door locks 32 of the vehicle 34. The side panels further include a notch 36 therein as shown adjacent the bottom thereof to permit movement of passenger seat belts therethrough, as required.

The upper transverse partition 18 is constructed of 1¼" thick plexiglass so as to be bullet resistant and extends from the roof of the vehicle to the top of the lower transverse panel 12. The top of the lower transverse panel 12 and the bottom of the upper transverse panel 18 are rigidly secured together by convenient means such as bolts 38.

A rectangular communicating opening 40 extends through the upper transverse panel 18 as shown best in FIG. 1. Closure 42 is provided over the opening 40 and is slidably movable into opening and closing positions with respect to the opening 40 in the tracks 44 and 46 bolted to the panel 18. Locking means 48 is partly secured to the panel 18 and partly secured to the closure 42 to permit locking of the closure in a closed position from the front of the vehicle.

The upper side panels 20 and 22 are constructed of polycarbonate plastic, are transparent and are rigidly secured to the opposite ends of the panel 18 and extend toward the front of the vehicle in which the partition is installed. The side panels 20 and 22 prevent aiming of weapons or the like at occupants in the front of the vehicle around the ends of the panel 18 from the rear of the vehicle.

Extensions 24 and 26, as shown, are rigidly secured to the ends of the panel 18 by convenient means such as bolts. The outer, free edges 50 and 52 of the extensions 24 and 26 are contoured to be complementary to the inner contour of the passenger compartment of the vehicle at the protective vehicle partition 10 and extend from substantially the top of the vehicle to a substantial distance below the rear door locks of the vehicle. The extensions 24 and 26 further inhibit aiming of weapons about the ends of the panel 18 and prevent access to the rear door locks 32 from the rear of the vehicle. In addition, the extensions 24 and 26 engage the rear window operators 54 and prevent a full 360° movement thereof with the rear doors of the vehicle closed. Some ventilation of the rear of the vehicle may be provided on partial rotation of the door operator without permitting the rear windows to be rolled down sufficient to allow egress therefrom.

The protective vehicle partition 10 is secured to the center posts of the vehicle 34 by convenient means such as a plate 56 extending longitudinally of the vehicle and bracket 58 shaped as shown and fasteners such as bolts, not shown.

With the protective vehicle partition installed in a vehicle, passengers in the front of the vehicle are protected from passengers in the rear of the vehicle by the partition, all parts of which are bullet resistant. Physical communication is permitted between the passengers in the front and rear of the vehicle through the communication window in the upper panel of the partition when it is desired by the passengers in the front of the vehicle.

As indicated above, with the protective vehicle partition 10 installed, the rear door locks 32 are controlled from the front of the vehicle and full operation of the rear windows is accomplished only with the rear doors open.

In addition, the protective vehicle partition installed between the center posts of a vehicle provides side impact the roll bar resistance to further protect all passengers of the vehicle.

The protective vehicle partition 10 has the additional feature of being a unitary device which can be installed in fully constructed vehicles and which can be removed and replaced in other vehicles, as desired.

While one embodiment of the present invention has been considered in detail, it will be understood that other embodiments and modifications thereof are contemplated. It is the intention to include all embodiments and modifications as are defined by the appended claims within the scope of the invention.

What I claim as my invention is:

1. A protective vehicle partition comprising a transversely extending lower panel constructed of opaque, bullet resistant, molded fiberglass, a transversely extending upper panel bolted to the top of the lower transverse panel constructed of transparent, bullet resistant plexiglass, a pair of tracks extending transversely of the upper transverse panel in spaced apart relation, an opening through the upper transverse panel between the tracks, a bullet resistant plexiglass closure slidably positioned in the tracks for opening and closing the opening through the upper transverse partition, locking structure operable between the upper transverse panel and the closure for locking the closure in a closed position over the opening through the upper transverse panel, lower side panels secured to the sides of the lower transverse panel extending toward the front of the vehicle and having an opening therethrough adjacent the rear door locks of the vehicle to permit access to the rear door locks from the front of the vehicle, upper transparent side panels constructed of bullet resistant polycarbonate plastic secured to the sides of the upper transverse panel and extending toward the front of the vehicle, plexiglass extensions at the ends of the upper transverse panel extending transversely of the vehicle having free edges which are contoured substantially in accordance with the inner contour of the upper portion of the vehicle at the protective vehicle partition extending from adjacent the top of the vehicle to a substantial distance below the vehicle rear door locks and engageable with the rear window operators of the vehicle to prevent rotation thereof a full 360° with the vehicle rear doors closed, and means securing the protective vehicle partition to the center posts of the vehicle.

2. A protective vehicle partition comprising a lower panel extending transversely across the lower portion of the vehicle centrally constructed of bullet resistant material, an upper transparent panel having a bottom rigidly secured to the top of the lower panel extending transversely completely across the upper portion of the vehicle constructed of bullet resistant material, upper side panels secured to the ends of the upper transverse panel and extending toward the front of the vehicle, and extensions secured to the ends of the upper transverse panel having free edges with substantially the contour of the inside of the vehicle at the location of the protective vehicle partition extending from adjacent the top of the vehicle to a substantial distance below the rear vehicle door locks.

3. Structure as set forth in claim 2, wherein the upper panel has an opening therethrough with a slidable closure associated therewith for physical access between the front and back of the vehicle.

4. Structure as set forth in claim 3, and further including locking means positioned on and operable between the closure and the top panel for locking the closure in a closed position over the opening through the upper panel from the front thereof.

5. Structure as set forth in claim 2, wherein the lower panel includes lower side panels projecting from the ends thereof toward the front of the vehicle.

6. Structure as set forth in claim 5, wherein the lower side panels have an opening extending therethrough transversely of the vehicle permitting access from the front of the vehicle to the rear door locks of the vehicle.

7. Structure as set forth in claim 2, wherein the extensions engage the rear door window operators with the rear doors closed to prevent full 360° rotation thereof.

8. Structure as set forth in claim 2, wherein the protective vehicle partition is secured to the center posts of the vehicle.

9. A protective vehicle partition comprising a lower panel extending transversely across the lower portion of the vehicle centrally constructed of bullet resistant material, said lower panel including lower side panels projecting from the ends thereof toward the front of the vehicle having an opening extending therethrough transversely of the vehicle permitting access from the front of the vehicle to the rear door locks of the vehicle, and an upper transparent panel having a bottom rigidly secured to the top of the lower panel extending transversely completely across the upper portion of the vehicle constructed of bullet resistant material.

10. Structure as set forth in claim 9, and further including transparent upper side panels secured to the ends of the upper transverse panel and extending toward the front of the vehicle.

11. Structure as set forth in claim 9, and further including extensions secured to the ends of the upper transverse panel having free edges with substantially the contour of the inside of the vehicle at the location of the protective vehicle partition extending from adjacent the top of the vehicle to a substantial distance below the rear vehicle door locks.

* * * * *